United States Patent Office 3,453,145
Patented July 1, 1969

3,453,145
BATTERY PLATE HAVING LAMINAR GRID
Joseph C. Duddy, Trevose, Pa., assignor to ESB Incorporated, a corporation of Delaware
Filed Nov. 3, 1967, Ser. No. 680,410
Int. Cl. H01m 35/08
U.S. Cl. 136—46          4 Claims

ABSTRACT OF THE DISCLOSURE

A battery plate has active material pasted on a grid laminated from at least three single grids. The grid conductors of one single grid are offset with respect to the grid conductors of at least one other single grid of the laminar grid. The plate is particularly useful as the positive in a lead-acid motive power battery, but with other active materials the plate may also be used as a negative in the lead-acid battery.

BACKGROUND OF THE INVENTION

The background of the invention will be stated by a reference to one particular plate, namely the pasted positive plate of the lead-acid storage battery. Discussion to follow in the description of the preferred embodiment will show that the construction of the laminar grid is such as to make the grid useful in a pasted negative plate.

As used in this background discussion, an electrode consists of one or more "plates," each "plate" in turn being composed of a "grid" which is surrounded by "active material." The active material of a charged positive plate consists of an oxide of lead, while the grid composition is lead or an alloy of lead with such other metals as calcium or antimony.

The "active material" is that portion of the "plate" which, during the electrochemical reaction that occurs upon discharge, participates in the reaction and thus contributes to the electrical or power output of the battery. Other factors being equal, the amount of power which a battery is capable of producing is directly proportional to the amount or quantity of active material employed.

The grid serves at least one, and frequently two or three functions in the plate. It is always a conductor of the electrical energy released by the active material during discharge (or, conversely, conveyed to the active material during charge), and it frequently also serves as a structural frame or support for the active material. Sometimes a third function of the grid is to serve as a source of raw materials from which new active material may be created when the plate is being overcharged. To the extent that the grid functions in this third role, its ability to function in the other two is slowly decreased; that is, as the outer surface of the grid is converted into active material during overcharging, by necessity there is a corresponding reduction in the amount of grid remaining to act as an electrical conductor or as a support. Many positive plates fail because the grid eventually becomes inadequate as a conductor or frame, or both. Thus the "life" of the plate, as expressed in terms of time or the number of charge-discharge cycles which the plate can withstand before failing, is frequently limited by the grid.

A number of factors combine to influence the design and dictate the performance of lead-acid battery plates, particularly the positive plates. First, plates should have a sufficiently thick grid to provide long life and have a sufficient qunatity of active material to produce the required amount of energy, but the amounts or thicknesses or both grid and active material, as well as the ratio between them, will vary with different applications for batteries. Second, to the extent that the grid must function as a structural supoprt for the active material it should be designed to do so, and so plate design may be concerned with such variables as chemical composition and physical properties of both grid and active material, as well as with the relative proportions of grid and active material. The chief factors causing the active material to dislodge from the structural grid are vibrations and the volumetric changes which accompany charging and discharging. Third, since the grid must serve as an electrical conductor and since the grid is usually a better conductor than is the active material, the plate should be so designed that the total resistance of both the grid and the active material is minimized. Fourth, to the extent that he grid may function as a source of raw material from which new active material may be created to replace that lost by vibrations or volumetric changes, the grid should be thick. The conversion or corrosion of grid material into active material occurs primarily when the plate is being overcharged, and so is of concern only where overcharging may be frequent and/or severe. The creation of new active material on and from the grid surface is necessarily at the expense of structural support, and so if too much of the grid is converted into active material the plate will fail structurally; the failure is further compounded by the fact that the grid is an electrical conductor, and its electrical continuity is reduced as structural failure occurs. Fifth, and finally, since the charging of uncharged positive plates begins at the grid surface and requires the presence of a three-phase interface of grid, uncharged active material, and electrolyte, it is necessary that the electrolyte be able to penetrate the active material to reach the grid surface. In this regard, for active material of a given porosity per unit of thickness the ability of the electrolyte to diffuse through the active material appears to vary inversely as a power which is approximately the square of the thickness of active material.

To illustrate how the various use requirements of batteries affect plate design, three different uses will be given.

At one end of the use spectrum are batteries intended for standby service, examples being those used to power switches, lights, and other apparatus during infrequent failures of conventional AC power. Such batteries are not often called upon to supply power, and may not be deeply discharged when they do supply power. Between power failures they are continuously or frequently provided with trickles of charging current, and may be subjected to overcharging in the process. These batteries are usually stationary and not subject to constant or large scale vibrations. One of the main requirements of such batteries is long life, measured at least in terms of time if not in cycles. To meet these requirements, the plates in these batteries may have relatively little active material, but should have relatively large, thick grids. Without too much difficulty the grid can simultaneously provide the necessary structural support, serve as a source of new active material, and retain good electrical continuity. The electrolyte is able to diffuse through the active material at a sufficiently rapid rate to meet recharge requirements with ease, due in part to the relatively thin deposit of active material and due also to the acceptability of using low recharging rates in standby batteries.

At the other end of the use spectrum are motive power batteries used to power vehicles driven by electric motors. Examples of vehicles now widely using motive power batteries are materials handling trucks and golf carts, and in the future passenger cars may become large users of such batteries. The plates in these batteries must be capable of producing large amounts of power during one discharge, and so by necessity must have large quantities of active material. Beyond this, the design of plates for motive power batteries poses a dilemma, for to achieve one desired feature, sacrifices must be made in some other desired feature. To be competitive with internal combustion engines as a vehicle power source, the motive power batteries must have long life, low cost, and—if they are to be used in passenger vehicles where long distances will be traveled on one discharge—they must have a high useful energy density, a requirement which places a premium on a high ratio of active material to grid and on minimizing the internal electrical resistance of the plate. The life of the plates is seriously threatened by the tendency of vibrations and volumetric changes to result in active material being dislodged from the grid. This tendency can be counteracted by surrounding the grid and active material with a retainer tubing, but this increases cost and introduces other complications. Long life is also threatened by the serious overcharging to which such batteries may be subjected by unattentive or inexperienced personnel, the result of which may be to cause excessive corrosion of the grid. Grid corrosion may be made less serious simply by starting with larger grids, but this lowers the energy density of the battery. The plates in motive power batteries are at best a compromise between several desirable features. (The significance of the plate claimed in this application as an improvement for motive power batteries will be made clear later.)

Falling somewhere between these two extremes is the lead-acid battery used for starting lighting, and ignition purposes in automobiles having gasoline engines. These automotive batteries are similar in many respects to the standby batteries mentioned above inasmuch as they often receive only slight discharges and are usually recharged soon after discharge by the automobile electrical system, but are like the motive power batteries in the sense that they are exposed to frequent and heavy vibrations and must withstand many cycles of charge or discharge. The life of an automobile battery may vary from one or two years to several years, depending in part upon whether the automobile voltage regulator is properly adjusted; if not set correctly, the regulator can cause severe overcharging, which results in unnecessary grid corrosion. The trend in recent years has been to make increasingly thinner plates to permit rapid electrolyte diffusion through the active material and consequently permit rapid recharging, but to offset this a greater number of plates has been required to provide the necessary capacity.

Having given this discussion of the factors influencing plate design and performance, a chronological review of the development of positive plates in the lead-acid battery will now be made.

One of the earliest positive plates was developed by the Frenchman, Gaston Planté, in the middle of the nineteenth century. The Planté plates were created by immersing solid sheets of lead in a dilute sulfuric acid electrolyte and subjecting those sheets to successive cycles of charging and discharging. The terms "forming" or "formation," by which is meant the cycling between lead and an oxide of lead through successive cycles of charge and discharge, date back at least to Planté, and may have originated with him. When the sheets were in the charged state a layer of an oxide of lead was present on the surface of the sheet, this oxide layer then being the "active material" and the remainder or non-oxidized portion of the sheet being the grid. By successive charge-discharge cycles the thickness of the active material layer could be increased, but at an ever decreasing rate due to the fact that the rate of electrolyte diffusion through the active material decreased as the thickness of the active material increased. The formation process used by Planté was time consuming and expensive. The thickness of the oxide layer obtainable in this manner was not only limited by the thickness of the sheets but also by the poor adhesion between the oxide active material particles and the grid; when the layer of active material was still relatively thin, an equilibrium point would be reached at which active material dislodged from the grid at the same rate at which the grid was being converted into active material. Thus the Planté plate was one of low capacity, and would be useful today only for standby applications having very low power requirements.

A significant improvement over the Planté plate was produced by another Frenchman, Camille Faure, who developed the idea of pasting active material onto a grid or substrate. Faure's plate is described in United States Patent No. 252,002, issued to him in 1882. The Faure plate could be formed more easily than the one of Planté, but suffered from the fact that its active material tended to separate from the grid rather easily.

During the 1880's efforts were undertaken by several Europeans to improve the ability of the grid to retain Faure's active material paste, Faure himself contributed to this creative activity by developing a laminated plate in which the active material paste was sandwiched between a sheet of grid material and a sheet of felt, the assembly being riveted together. See U.S. Patent No. 383,562, issued to Faure in 1888. Faure's idea of using laminated plates was followed by others who subsequently received patents for their developments, and today the classification of the United States Patent Office reflects this chain of work; in Class 136 under the broad subclass of Faure or pasted electrodes there is a subclass, 46, entitled "laminated grids" which contains patents showing both plates in which non-laminated grids are laminated with active materials and plates in which laminated grids are pasted with active materials. Most of these patents show grids consisting of sheets folded or coiled about themselves, or show large lead sheets or plates serving as grids. They generally are inadequate because of their relatively low ratio of active material to grid. Development of these heavy laminated grids for use in lead-acid batteries appears to have ceased altogether around the turn of the century, probably because alternatives which offered a higher ratio of active material to grid had by then been developed.

Other approaches first tried during the 1880's saw the heavy solid or perforated lead sheets which were used as grids give way to grids containing strands or grid conductors between which were empty cells or pockets into which active material could be pasted. Vinal, in his treatise entitled "Storage Batteries" (Fourth Edition, 1955) cites on pages 4 and 5 several German and British patents issued between 1881 and 1888 to Volckmar, Swan, Sellon, and Correns, and illustrates with pictures the grids patented by these men. Important features of these improved grids were such things as the particular configurations of bars in the grids, the use of a single grid consisting of a double lattice of bars having triangular cross-sections and inwardly pointing apexes, and the alloy composition of the grid material. While this approach had the desirable result of increasing the ratio of active material to grid, it also had the undesirable result of producing a plate in which the active material could be easily dislodged.

A modification of the Planté plate came late in the nineteenth century in Manchester, England. Rather than consisting of just a sheet of lead or a lead alloy as the Planté plate does, the unformed Manchester plate contains numerous holes into which buttons or coiled ribbons of crimped lead are placed and held secure by friction. The Manchester buttons offered a much larger surface area per unit of weight than did Planté's original lead sheet, and so offered more opportunity for active material to form.

Both the Planté and Manchester plates were characterized by exceptionally long lives as a result of having very thick grids (the uncharged portion of the sheets were the grids, and this was the vast majority of the sheet when the plates were new), but have nevertheless fallen into declining use because of their low capacity. Lead-acid batteries containing Manchester positive plates have been known to function for as long as 30 years before being removed from service, and on many occasions their retirement was due to insufficient capacity to meet increased power requirements rather than failure of the battery itself.

Following these early efforts, attempts to produce positive plates having high capacity, long life, and the ability to meet high discharge rate requirements have tended to divide along two alternative paths. Persons following one path were concerned with improving the pasted Faure plate, while down the other path traveled persons who abandoned pasting and concentrated instead on surrounding the grids with looser particles of active material held in place by a tubing.

Although some improvements have been made in pasted plates since they were developed by Faure, the basic problems encountered by him then still exist today: in order to arrive at a satisfactory ratio of active material paste to grid, it is necessary to use a grid in which the active material is pasted into the large empty cells or pockets between the grid strands or conductors, and when this is done the paste tends to fall out as a result of vibrations and volumetric changes. The advantages of pasted plates which account for their popularity are their low cost compared with other alternatives and the fact that they can be made thinner than tubular types.

One significant improvement which resulted in better retention of the active material paste in the grid came with the development in about 1919 of a process for making the active material, a process in which lead is abraded, pulverized, and oxidized in a mill. (For a discussion of this process and patents relating to it, see the litigation involved in Shimadzu v. The Electric Storage Battery Company, reported in volumes 21, 31, 36, 38, 41, 43, 47 and 51 of the United States Patent Quarterly.) This process produces lead or an oxide thereof having particles of irregular shape and nonuniform size, and it is believed to be the interlocking of these particles—made possible by their differing shapes and sizes—which contributes at least in part to the ability of the paste containing the lead compounds to be retained better in the grid.

The alternative to pasted plates which has been developed consists of a plate having numerous vertical spines, each of which is surrounded by a tubing filled with loose particles of active material. Such plates are commonly known as tubular plates. Developed around 1910 by E. W. Smith (see the following patents in which Smith is the inventor or a coinventor: 1,051,645, 1,054,801, 1,086,864, and 1,218,329), these plates overcome the disadvantages associated with the pasted plates, but cost more to manufacture. Rather than relying upon the grid to retain the active material as does the pasted plate, the tubing in the tubular plates holds the particles of active material in contact with the vertical spine or grid. Because the active material cannot escape from the spine or grid, tubular plates have long lives and are able to withstand both severe vibrations and the volumetric changes in the active material resulting from numerous deep discharges. Due to their construction the tubular plates are well suited for use in motive power batteries. Another advantage of the tubular plate results from the fact that the particles of active material are loose in the tubing rather than contained in a thick, dense paste, and thus the electrolyte may move more freely through the active material. In the more than half century since the tubular plates were developed by Smith, their construction principles have remained essentially unchanged, with subsequent efforts being devoted almost exclusively toward improving the tubing.

SUMMARY OF THE INVENTION

This invention provides a pasted plate having a grid laminated from at least three single grids, the grid conductors of which has been offset with respect to one another. The conventional advantages of pasted plates, ease of construction and low cost, are retained, while the ability of the new laminar plate to retain active material paste is greatly enhanced over previous pasted plates by virtue of having at least three single grids and offset grid conductors. The center single grid, perhaps more than the outer two of a three-grid laminate, resists corrosion in the acid electrolyte and thus continues to function for a long time as a support for the active material, giving the plate a long life. The internal electrical resistance of the laminar plate is reduced compared with either single grid pasted plates of the same thickness or pasted plates having laminated grids whose grid conductors are not offset with respect to each other.

DESCRIPTION OF THE PREFERRED EMBODIMENTS

Throughout the description and claims to follow certain words, phrases, and terms will be used with distinct meanings which should be set forth at this point.

A "single grid" means a grid consisting of a "grid frame," "grid conductors" inside and joined to the grid frame, and a "lug" attached to the grid frame. The grid conductors are essentially strands which supply a webbing or interlaced structure by which to hold active material in place and serve also as current conductors. The grid frame serves as the support to which the grid conductors are joined and conducts current between the grid conductors and the lug. The lug in effect is the terminal for the single grid, through which the grid current passes.

Although single grids may be constructed in numerous configurations, only two of the most familiar shapes or designs will be discussed herein for purposes of illustration. It should be understood, however, that the terminology used in this description and the accompanying claims is not limited to these two configurations unless clearly so indicated.

Figure 1:
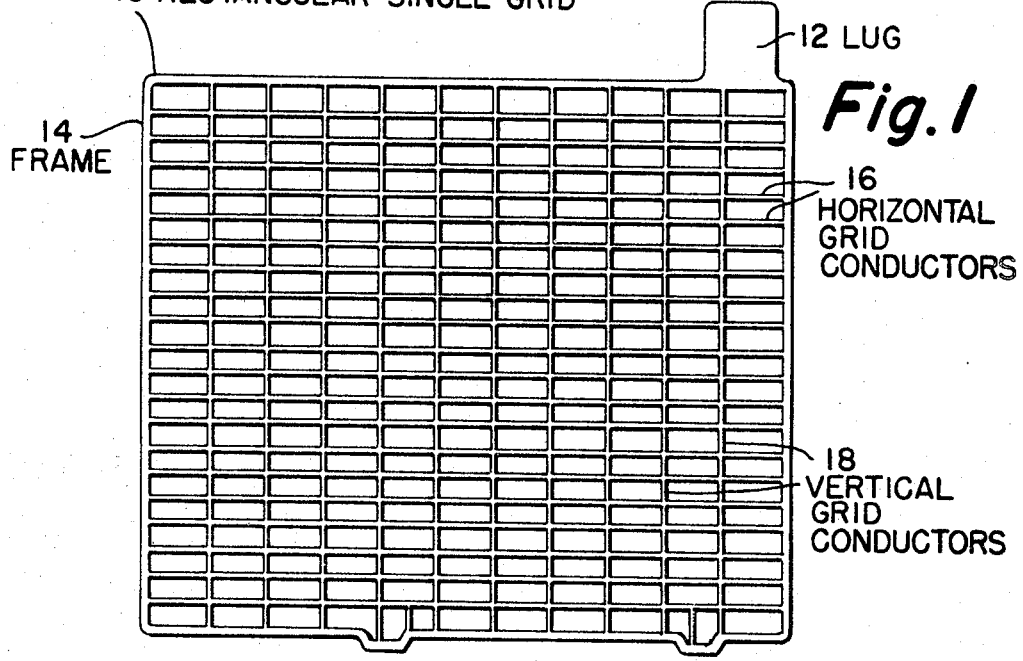
FIGURE 1 shows an unpasted rectangular single grid.
Figure 2:
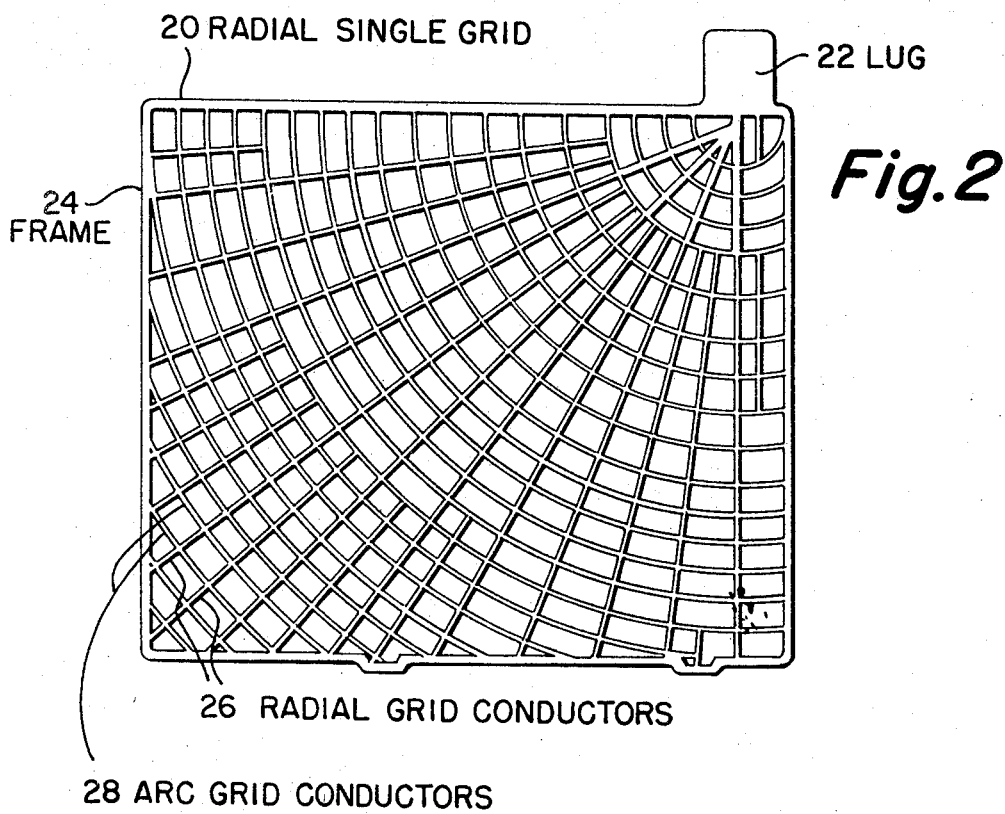
FIGURE 2 shows an unpasted radial single grid.

In FIGURE 1 there is shown a "single grid" 10 of rectangular configuration, having a lug 12, a grid frame 14, and horizontal and vertical grid conductors 16 and 18, respectively. This particular single grid design is in common use in automobile batteries today. In FIGURE 2 there is shown a "single grid" 20 of radial configuration, having a lug 22, a grid frame, 24, and a radial and arc grid conductors 26 and 28 respectively. The radial resign of a single grid has long been known, but is perhaps not so widely used to day as is the rectangular design.

A "laminar grid" is the result or product obtained when three more "single grids" are joined together in a composite or sandwich construction before active material is applied in or to any of the single grids. The single grids may be held together by spot welding or some other convenient method.

A "laminar grid having offset grid conductors" means a "luminar grid" in which the "grid conductors" of one "single grid" are "offset" with respect to the "grid conductors" of at least one other "single grid" of the laminar grid. By "offset" is meant offset, staggered, or misaligned in some fashion. Preferably although not necessarily the grid conductors of an interior single grid are offset with respect to the grid conductors of both exterior single grids. Only a few of the theoretically infinite number of different "laminar grids having offset grid conductors" are shown in the drawings for illustrative purposes, and these are made using the "rectangular single grids" of FIGURE 1 and/or the "radial single grids" of FIGURE 2.

Figure 3:
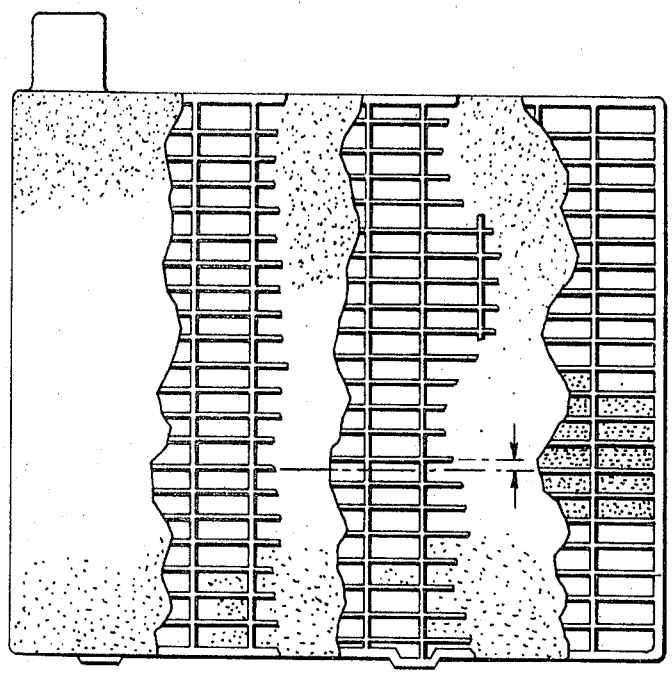
FIGURE 3 shows a pasted plate having a laminar grid of three rectangular single grids and having offset grid conductors. Portions of the paste and single grids are removed to show single grid configurations and orientations.

FIGURE 3 represents a plate containing a "laminar grid having offset grid conductors" in which the "laminar grid" consists of three rectangular single grids, the middle of which has horizontal grid conductors which are offset with respect to the horizontal grid conductors of the other two single grids, while the horizontal grid conductors of the outer grids are in alignment with each other. Although FIGURE 3 does not show it, the vertical grid conductors may be offset instead or, or in addition to, the horizontal grid conductors.

Figure 4:
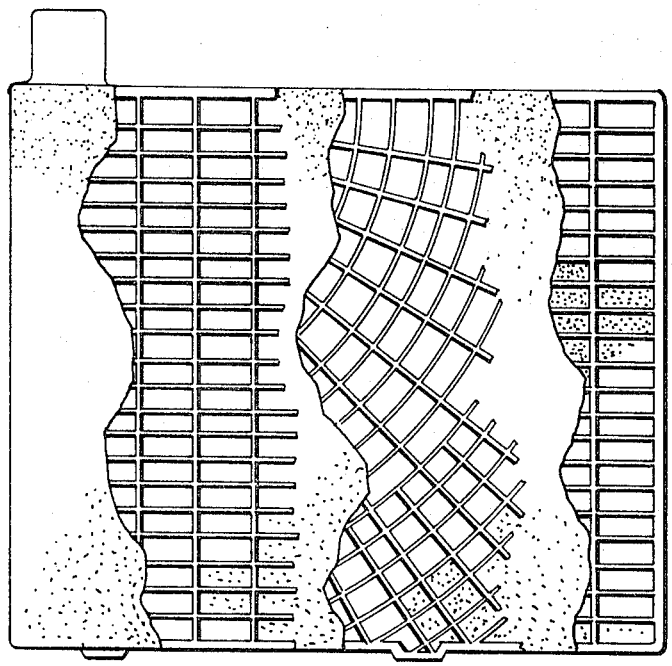
FIGURE 4 shows a pasted plate having a laminar grid in which a radial grid is sandwiched between two rectangular single grids. Portions of the paste and single grids are removed to show single grid configurations and orientations.

FIGURE 4 represents a plate containing a "laminar grid having affset grid conductors" in which a single grid of radial design is sandwiched between two rectangular single grids whose grid conductors are not offset.

Figure 5:
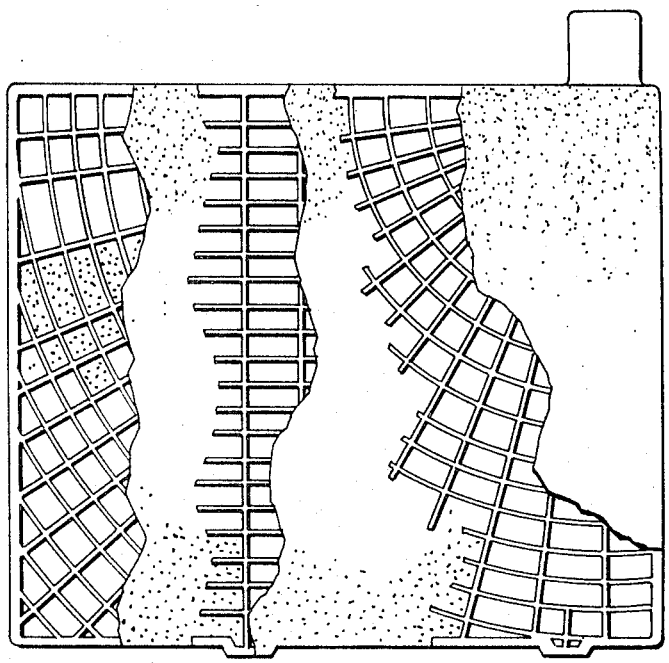
FIGURE 5 shows a pasted plate having a laminar grid in which a rectangular single grid is sandwiched between two radial single grids. The two radial single grids have radial grid conductors converging on the grid lugs. Portions of the paste and single grids are removed to show single grid configurations and orientations.

FIGURE 5 is similar to FIGURE 4 except that the rectangular single grid is sandwiched between two radial single grids whose grid conductors are not offset.

Figure 6:
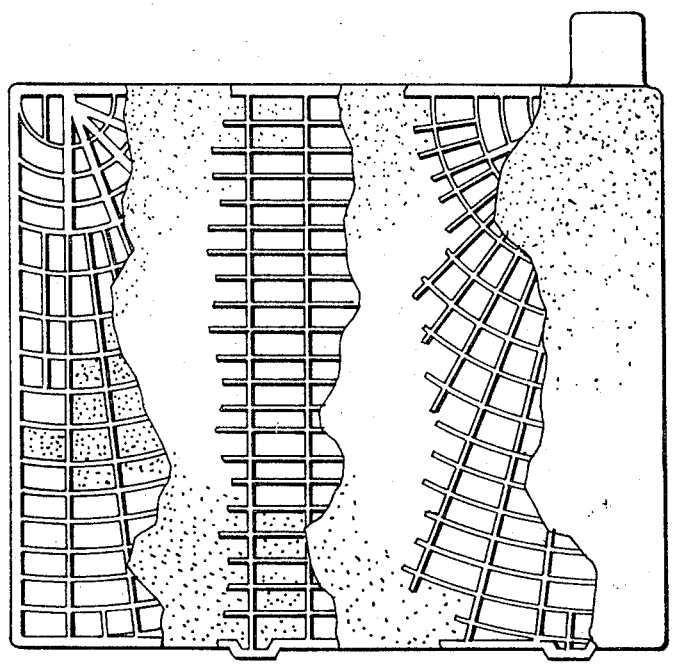
FIGURE 6 is similar to FIGURE 5, except that one radial single grid has radial grid conductors converging on its lug while the other radial single grid does not.

FIGURE 6 illustrates a plate containing a "laminar grid having offset grid conductors" in which the "laminar grid" consists of a rectangular single grid sandwiched between two radial single grids, one of which has radial conductors converging on the lug and the other of which does not.

Again, the illustrations stated above and shown in FIGURES 3–6 are merely representative of the many constructions of plates containing "laminar grids having offset grid conductors," and by no means do these illustrations exhaust all possible such constructions.

Figure 7:
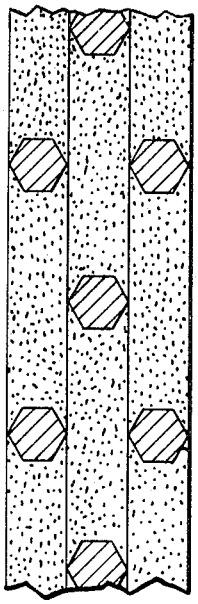
FIGURE 7 shows a cross-section of a pasted plate having a laminar grid of three single grids whose grid conductors are offset with respect to one another.
Figure 8:
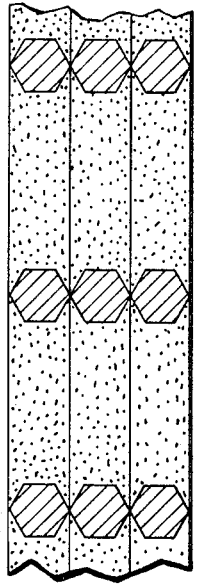
FIGURE 8 shows a cross-section of a pasted plate having a laminar grid of three single grids whose grid conductors are not offset with respect to one another.

One of the advantages of a laminar grid having offset grid conductors is its greater ability to retain active material paste. As best shown in FIGURE 7, between the grid conductors of the outer single grids is a pocket into which the active material paste may be spread. The pocket tends to protect the entrapped paste from subsequently becoming dislodged from the grid. The paste which is spread between the grid conductors is one of the outer single grids is reinforced and made more difficult to dislodge by the offset grid conductor of the center single grid. These features are not present in either a pasted single grid or a laminar grid in which the grid conductors are not offset, the latter being shown in FIGURE 8. This reinforcing feature of the laminar grid having offset grid conductors being purely mechanical in nature, it is applicable to both positive and negative plates of the lead-acid battery. It will be noted that FIGURES 3 through 6 all illustrate constrictions in which cross-sections similar to that shown in FIGURE 7 may be obtained by appropriate sectioning. (The grid conductors in FIGURES 7 and 8 have arbitrarily been shown to have hexagonal cross-sections, although some other shape may be preferable.)

Another advantage of plates having laminar grids containing offset grid conductors, equally applicable to positive and negative plates, is the reduced internal electrical resistance of the plate compared with either pasted plates having single grids or pasted plates having laminar grids without offset grid conductors. FIGURE 7 shows that the greatest distance from a particle of active material to the grid conductor nearest it is less than the corresponding distance in FIGURE 8, and thus the internal resistance of the plate of FIGURE 7 is less than that of FIGURE 8.

Still another advantage of a pasted plate having a laminar grid, equally applicable to positive and negative plates, is that the ratio of grid surface area to weight of active material is increased, when compared with pasted plates having single grids containing larger grid conductors. To the extent that such characteristics as active material adhesion to the grid and electrical conductivity-between the paste and the grid are improved by increasing the ratio of grid surface area to weight of active material, the pasted plates having laminar grids are improvements by virtue of having increased grid surface area.

One of the most important advantages of the laminar grids is associated with plates used as positives in the lead-acid system. As can be seen from the background above, it is desriable to have the grid act both as a source of new material to replace that dislodged by vibration and by volumetric changes occurring in repeated charge-discharge cycles, and as a support of the active material, but these roles tend to be incompatable with each other. In this respect a positive plate having a laminar grid offers a good compromise, the result of which is a combination of sustained high capacity and long life. It may be theorized that during overcharge the grid conductors of the outer single grids, being nearest the source of electrolyte, are the first to react chemically with the electrolyte to create new active material on the grid conductor surface, and that this reaction produces new active material at the same rate at which it is lost due to vibration and volumetric changes; the time required to reach this equilibrium is minimized due to the increase ability of the plate to retain active material. It is even possible that when the plate is new the grid conductor material might be converted into active material at a faster rate than that at which active material was dislodged due to vibrations and volumetric changes, in which case the plate might show an increase in capacity. (Some increase in capacity in very early cycle life may also occur as a result of the conversion of free lead particles in the active material to oxides of lead, which conversion is caused by charging.) The result expected by this theory would be sustained capacity. Going on, the conductor grids of the interior single grid, being most remote from the source of electrolyte, are least accessible to the electrolyte and hence are least corroded by the electrolyte during overchange. Further reducing the extent to which the interior single grid be corroded is the fact that the deposit of applied active material paste surrounding the grid acts as a retainer for the new active material formed on the grid surface by overcharging, and prevents this new active material from dislodging; and the new active material, in turn, tends to prevent still further the electrolyte from reaching the uncorroded grid. The result expected by this reasoning is that the interior single grid would continue functioning as a structural support despite repeated cycles of charge and discharge, and the plate having a laminar grid would have long life.

Limited experimental data suggest that the theories described above may be correct.

To illustrate the ability of pasted plates containing laminar grids having offset grid conductors to maintain high capacity while withstanding numerous cycles of charge and discharge, a lead-acid cell was constructed containing 6 positive plates and 7 negative plates. Each positive plate was similar to that shown in FIGURE 3. The three single grids were held together by being welded with a lead-antimony alloy. A conventional lead paste used for automobile battery plates was applied, producing a plate having an average thickness of 0.160 inch. The total weight of the 6 positive plates was 11.70 pounds, of which the active material weighed 6.42 pounds and the grids weighed 5.28 pounds (a ratio of active material to grid of 1.22).

The cell was subjected to cycles of charge and discharge and its capacity observed. The repetitive time cycle consisted of 4 hours discharge through a fixed load. The discharge through a fixed load. The discharge current started at 42 amperes and essentially linearly decreased to 38 amps. at the end of discharge. Immediately following discharge at 2.75 hour high rate recharge ensued. The charge rate started at 48 amps. and decreased linearly to 44 amps. Immediately following the high rate recharge, there was a low rate charge of approximately 3.6 hours duration which had a starting current of 19 amps. that decreased to 14 amps. after 2 hours and then was held steady until the end of charge. Immediately after the low rate recharge, the discharge part of the cycle was initiated automatically. Approximately 160 amp. hours were removed during discharge, 129 amp. hours were replaced during the high rate recharge, and 64 amp. hours were replaced during the low rate recharge giving about 17% overcharge per cycle. The results of the cycling are shown in table.

TABLE

| Number of cycles | Discharge rate, amperes | Capacity, ampere hours, cell having laminar grid plates |
|---|---|---|
| 1 | 35 | 185 |
| 3 | 35 | 186 |
| 112 | 35 | 196 |
| 212 | 35 | 196 |
| 862 | 35 | 192 |
| 945 | 58.5 | 181 |
| 946 | 100 | 155 |
| 1,005 | 35 | 196 |

The cell containing plates having laminar grids exhibits a long life and appears to have good capacity maintenance. Other positive pasted plates having laminar grids with offset grid conductors, similar to those shown in FIGURES 4, 5, and 6, were tested and comparable results were obtained.

In summary, the plate containing a laminated grid having offset grid conductors appears to offer significant advantages, especially when used as a positive in the lead acid battery.

I claim:

1. A battery plate consisting of a laminar grid having offset grid conductors with active material deposited therein, said laminar grid consisting of at least three single grids joined together in a sandwich construction.

2. The plate in claim 1 in which the grid conductors of an interior single grid are offset with respect to the grid conductors of both exterior single grids.

3. A positive plate for a lead-acid cell consisting of a laminar grid having offset grid conductors with active material deposited therein, said laminar grid consisting of at least three single grids joined together in a sandwich construction.

4. The plate in claim 3 in which the grid conductors of an interior single grid are offset with respect to the grid conductors of both exterior single grids.

References Cited

UNITED STATES PATENTS

| 712,316 | 10/1902 | Loppe et al. | 136—46 |
| 1,590,962 | 6/1926 | Stecker | 136—38 |
| 2,261,053 | 10/1941 | De Martis et al. | 136—37 |
| 2,275,194 | 3/1942 | Sizelove | 136—36 |
| 2,716,146 | 8/1955 | Raney | 136—49 |

WINSTON A. DOUGLAS, *Primary Examiner.*

C. F. LE FEVOUR, *Assistant Examiner.*